Jan. 10, 1928.

A. THOMAS

SHOCK ABSORBER

Filed March 8, 1926     3 Sheets-Sheet 1

1,655,443

Inventor:
August Thomas
By John O. Seifert
Attorney

Jan. 10, 1928.

1,655,443

A. THOMAS

SHOCK ABSORBER

Filed March 8, 1926        3 Sheets-Sheet 2

Inventor:
August Thomas
By John O. Seifert
Attorney

Patented Jan. 10, 1928.

1,655,443

UNITED STATES PATENT OFFICE.

AUGUST THOMAS, OF BERLIN-STEGLITZ, GERMANY, ASSIGNOR TO CARL von HARYES, OF BERLIN, GERMANY.

SHOCK ABSORBER.

Application filed March 8, 1926, Serial No. 93,165, and in Germany June 27, 1925.

This invention relates to shock absorbers, which are used for the purpose of damping out suddenly arising shocks, especially shocks which by reason of the unevenness of the roadway are being transmitted to the frame of automobiles or other road vehicles.

According to this invention a casing of helical conformation is secured to the frame of the vehicle and a laminated plate spring is inserted with one of its ends into this casing, while the other end of said spring is connected to a band, which is carried around the casing and eventually also around a roller secured to the vehicle frame and connected at its free end to the axle of the vehicle. If now the tension of the main or supporting spring of the vehicle is reduced by a depression in the roadway, so that the distance between the axle and the frame of the vehicle is increased, a pull will be exerted upon the band and its rearward end which is connected with the outer end of the spring will push the spring into the casing. A strong braking action will thus be obtained by reason of the main or supporting spring being forcibly subjected to flexure. If the main or supporting spring of the vehicle is again compressed, the opposite operation will take place.

Figure 1:
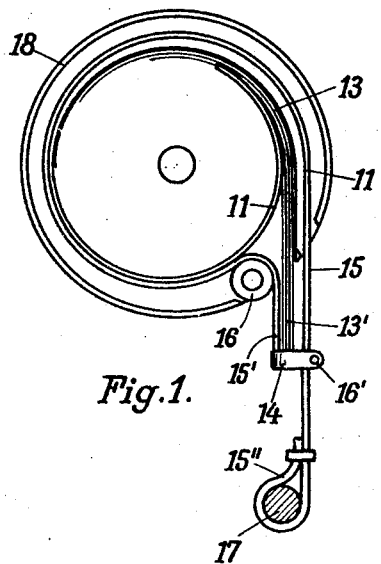
Figure 2:
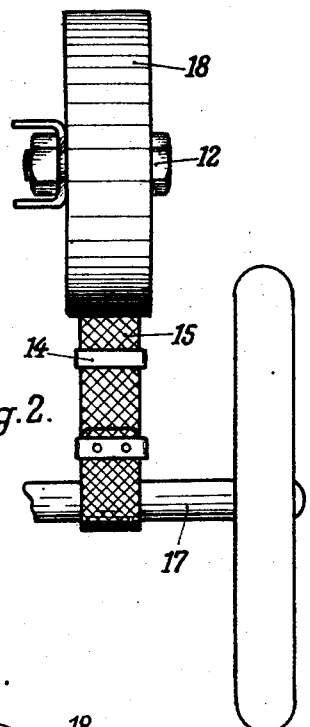
Figure 3:
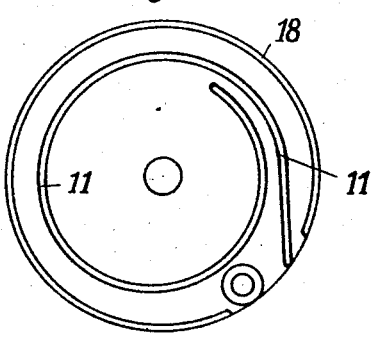
Figure 4:
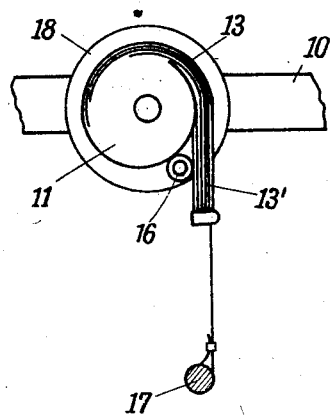
Figure 5:
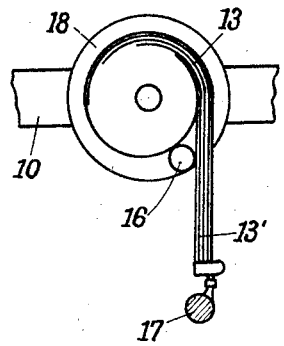
Figure 6:
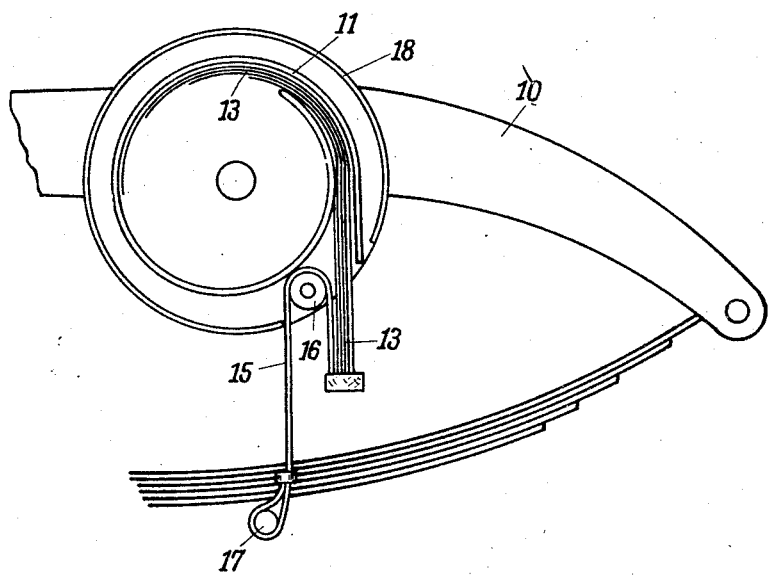
Figure 8:
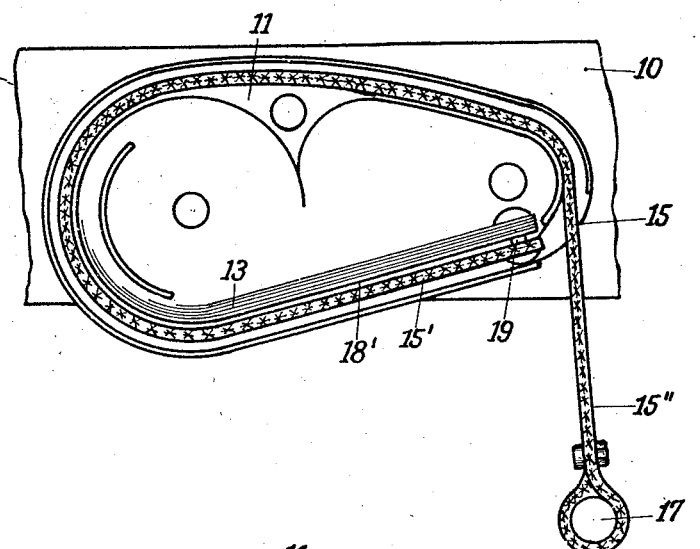
Figure 7:
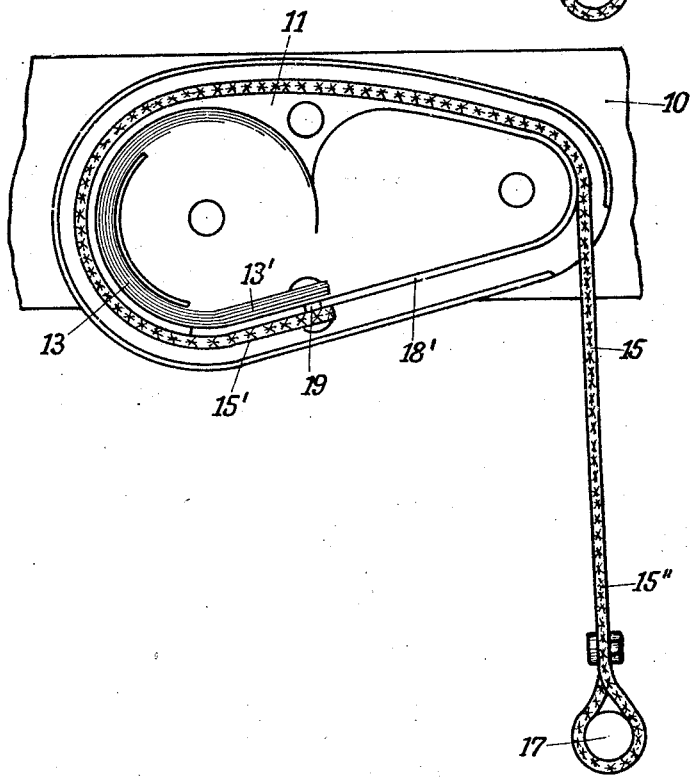

In the drawings there is represented as an example a shock absorber according to this invention, Fig. 1 being a side view showing the interior of the new shock absorber, Fig. 2 a rear view taken on Fig. 1, and Fig. 3 a detail view of the helical casing. Figs. 4 and 5 serve for explaining the operation of the device, Fig. 6 shows a modification of the device according to Figs. 1 and 2, while Figs. 7 and 8 are sections through a further modification of the device shown in Figs. 1 to 3. The same reference numerals indicate the same devices throughout the several figures of the drawing.

Secured to the vehicle frame 10 is a casing 11 of helical conformation as shown in detail in Fig. 3, a bolt 12 being preferably used for fastening said casing to the frame. A laminated plate spring 13 is inserted into the casing 11, the outwardly projecting end 13' of said spring being connected to a clip 14. A band 15 is fastened at one of its ends 15' to said clip, said band being carried over a guiding roller 16 around the casing 11, and passing freely through said clip, in which it may be guided by a guiding roller 16'. At its other end 15'' the band 15 is laid around the axle 17 of the vehicle. The casing 11 is surrounded by a cap 18 for protecting the casing against entrance of dust or the like.

Figs. 4 and 5 show the operation of the device. If the distance between the vehicle frame 10 (Fig. 4) and the axle 17 of the vehicle is increased, the end 15' (Fig. 1) of the band 15 will be drawn towards the casing and therewith also the clip 14 brought nearer the casing. This clip therefore will move the end 13' of the laminated plate spring 13 in upward direction and thereby cause the spring to enter into the casing. The spring will thus be forcibly bent, this forced bending resulting in a strong braking action.

If the axle 17 of the vehicle again approaches the frame of the vehicle 10 (Fig. 5), the spring will again return to its normal stretched condition.

This procedure of the spring, viz. the alternate bending and stretching of the spring and the alternate motion of the spring into and out of the casing will continue as long as the vehicle is travelling over an uneven road.

The modification of the shock absorber according to Fig. 6 differs from the device shown in Figs. 1 to 5 only in the mode of guiding the band 15.

According to Fig. 6 the band 15 passes from the axle 17 over the roller 16 directly to the clip 14 (Fig. 1), which is firmly connected to the outer end of the spring 13. The frictional effect between the band 15 and the helical surface of the casing 11 in the construction according to Fig. 1 is therefore not present in the modification according to Fig. 6.

In the further modification of the shock absorber according to Figs. 7 and 8 the laminated plate spring 13 is fully concealed within the casing 11 and will therefore be effectively protected against soiling, rusting and the like. For this purpose the helical casing 11 is made of oval, helical form and provided with a slot 18' at its underside. The bolt 19 may move within this slot, said bolt connecting the end 13' of the laminated plate spring with the end 15' of the band 15. The latter is carried around the casing 11 and again secured at its end 15'' to the axle of the vehicle.

The operation of the device may also be seen from Figs. 7 and 8. If the distance between the vehicle frame 10 and the axle 17 of the vehicle is increased, the band 15 will be pulled out of the casing 11, and since the end of the band is connected with the end of the spring 13 by means of the bolt 19, the spring will be inserted into the casing which is provided with proper guiding surfaces. In this way the bending of the spring is forcibly brought about, and the desired braking action will take place. If afterwards the distance between the vehicle frame and the axle decreases (Fig. 8) the spring will again be stretched.

The modification according to Figs. 7 and 8 is of advantage on account of the fact that the spring will be protected against soiling. In addition to this the oval form of the casing will adapt itself better to the form of the vehicle frame and may be manufactured more easily.

As may be seen from the foregoing the braking or shock-absorbing action of the spring 13 takes place only, if the distance between the axle of the vehicle and the vehicle frame is increased, that is if the tension of the main spring of the vehicle is reduced. This is due to the fact that the spring 13 is pressed or pushed into the helical casing, whereby the said spring will be forced to bend, thus causing the braking or shock-absorbing action. On the other hand, if the axle of the vehicle again approaches the frame of the vehicle, the spring 13 will come out of the casing by its tendency to stretch, whereby no braking or shock-absorbing action will take place. This feature of the shock absorber according to this invention results in especial advantages, because the main spring of the vehicle which is put under tension during approaching of the axle and the frame of the vehicle is so designed, that it will properly take up the strain caused thereby.

In the modification according to Figs. 1 to 5 and Figs. 7 and 8, moreover, the braking or shock-absorbing action of the spring 13 will be further augmented, by the action of the band 15, which is pulled out of the helical casing over the surface thereof. Thus the friction between the band 15 and the surface of the casing 11, which takes place during approaching of the vehicle axle and the frame, will exert a strong braking or shock absorbing effect in addition to that caused by the bending of the spring 13. This braking or shock absorbing effect of the band 15 will disappear during the opposite motion, that is if the distance between the axle and the frame of the vehicle is increasing. The friction between the band 15 and the casing 11, however, is not utilized as a braking or shock absorbing feature according to the construction shown in Fig. 6. In this case the band 15 is not carried around the casing 11 and only lead around the guiding roller 16.

What I claim is:

1. A shock absorber for automobiles or other road vehicles, comprising a helical casing, a spring mounted within said casing and having the tendency to come out of the casing, a band connecting said spring to the axle of the vehicle, said band being adapted to press said spring into said casing if the axle of the vehicle and the frame thereof are moving away from each other, substantially as described and for the purposes set forth.

2. A shock absorber for automobiles or other road vehicles, comprising a helical casing, a spring within the helical surface of said casing, a band laid around the outer surface of said casing, one end of said band being connected to the end of said spring projecting from said casing, the other end of said band being adapted to be fastened to an axle of the vehicle.

3. A shock absorber, as specified by claim 1, having a clip provided at the end of the spring which projects from the casing, one end of the band being connected to said clip and the other end being freely passed through said clip at a point in front of the extreme other end of said band, which may be fastened to an axle of the vehicle.

4. A shock absorber for automobiles or other road vehicles, comprising a helical casing, a spring mounted within said casing and having the tendency to come out of the casing, a band laid around the outer surface of said casing, at the outer end of said spring, one end of said band being connected to said clip and the other end being freely passed through said clip and connected to an axle of the vehicle, and a roller mounted on said casing at a point near the end of said band which is connected to said clip, said roller being adapted to serve as a guiding means for said band for keeping the same in better frictional contact with the outer surface of said casing.

5. A shock absorber according to claim 4, wherein the band passes from the clip around the roller, thereupon along the outer surface of the casing, through said clip to an axle of the vehicle.

6. A shock absorber, as specified by claim 1, having a cap which surrounds the helical casing, said cap serving for protecting said casing against soiling or the like.

In testimony whereof I have affixed my signature.

AUGUST THOMAS.